United States Patent
Poplack et al.

(10) Patent No.: US 8,296,121 B2
(45) Date of Patent: Oct. 23, 2012

(54) METHOD AND APPARATUS FOR CONTROLLING POWER IN AN EMULATION SYSTEM

(75) Inventors: Mitchell G. Poplack, San Jose, CA (US); William F. Beausoleil, Hopewell Jucntion, NY (US); Tung-Sun Tung, Cupertino, CA (US); James Tomassetti, Kingston, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 307 days.

(21) Appl. No.: 11/789,677

(22) Filed: Apr. 25, 2007

(65) Prior Publication Data

US 2008/0270105 A1 Oct. 30, 2008

(51) Int. Cl.
| G06F 9/455 | (2006.01) |
| G06F 1/00 | (2006.01) |
| G06G 7/54 | (2006.01) |
| G01K 1/00 | (2006.01) |
| G01K 3/00 | (2006.01) |
| G01K 5/00 | (2006.01) |
| G01K 7/00 | (2006.01) |
| G01K 9/00 | (2006.01) |
| G01K 11/00 | (2006.01) |
| G01K 1/08 | (2006.01) |
| G01K 13/00 | (2006.01) |
| G01K 17/00 | (2006.01) |

(52) U.S. Cl. ............ 703/23; 703/18; 702/130; 702/132; 713/300

(58) Field of Classification Search .................. 713/300, 713/340, 322; 703/23, 1, 18, 28; 702/132, 702/130; 700/299
See application file for complete search history.

(56) References Cited

U.S. PATENT DOCUMENTS

| 4,518,905 | A | * | 5/1985 | Rhodes, Jr. | 318/661 |
| 5,430,881 | A | * | 7/1995 | Ikeda | 713/322 |
| 5,451,892 | A | * | 9/1995 | Bailey | 327/113 |
| 5,475,847 | A | * | 12/1995 | Ikeda | 713/322 |
| 5,483,102 | A | * | 1/1996 | Neal et al. | 257/712 |
| 5,485,127 | A | * | 1/1996 | Bertoluzzi et al. | 331/69 |
| 5,535,401 | A | * | 7/1996 | Rawson et al. | 713/340 |
| 5,943,490 | A | * | 8/1999 | Sample | 703/28 |
| 6,049,879 | A | * | 4/2000 | Davis et al. | 713/300 |
| 6,134,667 | A | * | 10/2000 | Suzuki et al. | 713/300 |
| 6,216,235 | B1 | * | 4/2001 | Thomas et al. | 713/501 |
| 6,336,080 | B1 | * | 1/2002 | Atkinson | 702/132 |

(Continued)

FOREIGN PATENT DOCUMENTS

WO WO 2006/056824 * 1/2006

*Primary Examiner* — Mary C Jacob
*Assistant Examiner* — Aniss Chad
(74) *Attorney, Agent, or Firm* — Holland & Knight LLP; Brian J. Colandreo, Esq.; Mark H. Whittenberger, Esq.

(57) ABSTRACT

Method and apparatus for controlling power in an emulation system are described. In one example, a first interface is configured to receive requirement information for a logic module to be emulated from a host computer system. The requirement information includes at least one of a power requirement or a thermal requirement. A second interface is configured to receive measurement data from sensors in the emulation system. A controller is configured to control at least one of a synchronization system, a power regulation system, or a thermal system in the emulation system in response to the requirement information and the measurement data to reduce power load of the emulation system.

21 Claims, 5 Drawing Sheets

U.S. PATENT DOCUMENTS

| | | | |
|---|---|---|---|
| 6,363,490 B1 * | 3/2002 | Senyk | 713/300 |
| 6,470,289 B1 * | 10/2002 | Peters et al. | 702/132 |
| 6,618,698 B1 * | 9/2003 | Beausoleil et al. | 703/23 |
| 6,654,894 B2 * | 11/2003 | Kaminski et al. | 713/300 |
| 6,777,900 B2 * | 8/2004 | Lee | 318/268 |
| 6,865,506 B1 * | 3/2005 | Escobar et al. | 702/130 |
| 6,975,047 B2 * | 12/2005 | Pippin | 307/117 |
| 7,123,996 B2 * | 10/2006 | Fukushima et al. | 700/299 |
| 7,155,617 B2 * | 12/2006 | Gary et al. | 713/300 |
| 7,174,468 B2 * | 2/2007 | Gary et al. | 713/300 |
| 2005/0267732 A1 * | 12/2005 | Beausoleil et al. | 703/28 |
| 2006/0087278 A1 * | 4/2006 | Furem | 318/778 |
| 2007/0045825 A1 * | 3/2007 | Chan et al. | 257/723 |
| 2007/0078635 A1 * | 4/2007 | Rasmussen et al. | 703/1 |

* cited by examiner

METHOD AND APPARATUS FOR CONTROLLING POWER IN AN EMULATION SYSTEM

BACKGROUND OF THE INVENTION

1. Field of the Invention

Embodiments of the invention generally relate to circuit design emulation systems and, more specifically, to a method and apparatus for controlling power in an emulation system.

2. Description of the Related Art

The usefulness of software driven emulators has increased enormously with growth in the complexity of integrated circuits. Basically, an emulation engine operates to mimic a logical design of a set of one or more integrated circuit chips. Emulation engines typically contain an interconnected array of emulation processors. Each emulation processor can be programmed to evaluate logic functions. The program-driven processors operate together as an interconnected unit, emulating an entire desired logic design. As integrated circuit designs grow in size, more emulation processors are required to accomplish the emulation task.

Due to the increasing number of emulation processors, the power and cooling requirements of processor-based emulation systems are relatively high. Historically, this has meant that users of such systems must provide specialized current supply and cooling equipment. This creates a barrier for some users, where the requirements of such specialized equipment are onerous. As such, there is a need in the art to control power and temperature in an emulation system.

SUMMARY OF THE INVENTION

Method and apparatus for controlling power in an emulation system are described. One aspect of the invention relates to controlling power in an emulation system coupled to a host computer. A first interface is configured to receive requirement information for a logic module to be emulated from the host computer system. The requirement information includes at least one of a power requirement or a thermal requirement. A second interface is configured to receive measurement data from sensors in the emulation system. A controller is configured to control at least one of a synchronization system, a power regulation system, or a thermal system in the emulation system in response to the requirement information and the measurement data to reduce power load of the emulation system.

Another aspect of the invention relates to an emulation system. The emulation system includes an emulation engine. A synchronization module is configured to provide clock signals to the emulation engine. A communication module is provided. A cooling system is configured to cool the emulation engine. A power regulation system is configured to provide power to the emulation engine. A sensor system is configured to measure at least one of temperature or current. A control system is configured to receive requirement information for a logic module to be emulated from the communication module, receive measurement information from the sensor system, and control at least one of the synchronization system, the power regulation system, or the cooling system in response to the requirement information and the measurement data to reduce power load of the emulation system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
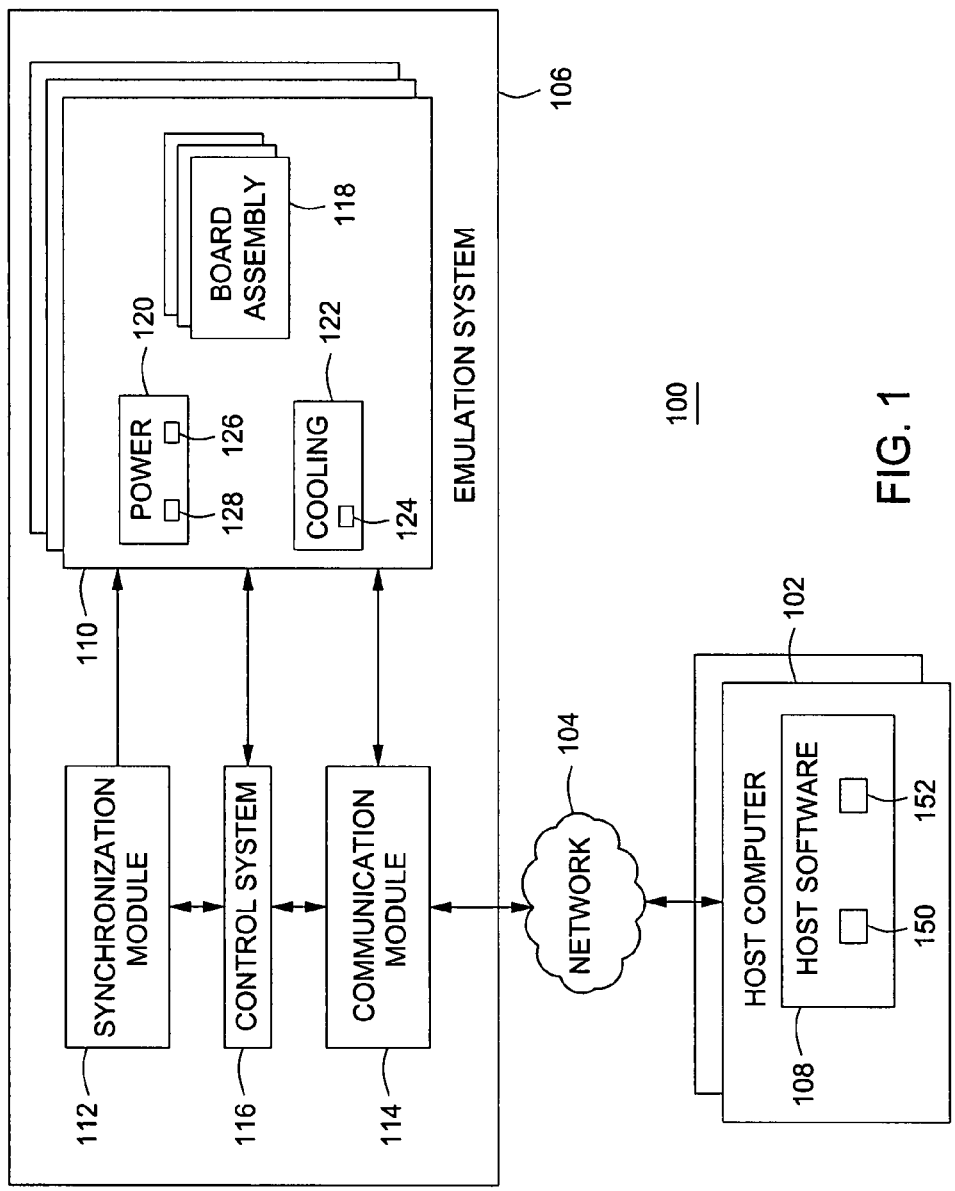
FIG. 1 is a block diagram depicting an exemplary embodiment of a circuit design verification system in accordance with one or more aspects of the invention.

FIG. 1 is a block diagram depicting an exemplary embodiment of a circuit design testing system 100 in accordance with one or more aspects of the invention. The system 100 includes one or more host computer systems 102, a network 104, and an emulation system 106. Each of the computer systems 102 is configured for communication with the emulation system 106 via the network 104. The network 104 may comprise any type of computer network known in the art, such as an Ethernet network. Each of the computer systems 102 executes host software 108, which may provide one or more functions. The host software 108 may be used to configure the emulation system 106 to emulate a device and to establish an initial state of the emulated device by loading values into registers, latches, or other constructs. The host software 108 may be used to capture data from the emulation system 106 for purposes of monitoring. The host software 108 may also contain a compiler for translating a design specification for a device into a configuration specification for the emulation system 106.

The emulation system 106 is configured to emulate one or more devices (e.g., microprocessors) on behalf of the computer systems 102 (also referred to as logic models). That is, the emulation system 106 is a multi-user system and may be emulating more than one device at a time. The emulation system 106 includes one or more mechanical frames 110 (e.g., three are shown), a synchronization module 112, a communication module 114, a control system 116. Each of the frames 110 includes one or more emulation board assemblies 118 (e.g., two are shown). Each of the emulation board assemblies 118 comprises a printed circuit board having various components and interconnections, as discussed below.

In some embodiments, each of the frames 110 further includes a power regulation system 120 and a cooling system 122. Cooling systems are also referred to as thermal systems. The terms "cooling" and "thermal" are used interchangeably herein. The power regulation system 120 provides regulated current to the board assemblies 118 of the associated frame. Accordingly, the power regulation system 120 provides for bulk power regulation. The cooling system 122 controls cooling for the board assemblies 118 of the associated frame. Accordingly, the cooling system 122 provides for bulk cooling. For example, the cooling system 122 may control air movers and/or liquid cooling fluid for the board assemblies 118 of the associated frame.

In other embodiments, power regulation and cooling systems are shared among all of the frames 110 or groups of the frames 110. For example, the power regulation system 120 may regulate current for the board assemblies 118 of the frames 110. The cooling system 122 may control cooling for the board assemblies 118 of the frames 110. Those skilled in the art will appreciate that the emulation system 106 may include multiple groups of frames, each group having its own power regulation and cooling systems. As used herein, the term "bulk power regulation system" is meant to encompass one or more power regulation systems associated with a frame, groups of frames, or each of the frames. The term "bulk cooling system" is meant to encompass one or more cooling systems associated with a frame, groups of frames, or each of the frames.

The synchronization module 112 drives clock and control signals that synchronize the frames 110 and permit the frames 110 to behave as a single emulation system. The communication module 114 permits communication between the host software 108 on one or more computer systems and the frames 110. The control system 116 is configured to adaptively monitor and control power in the emulation system 106. The control system 116 is described below with respect to FIG. 4.

Figure 2:
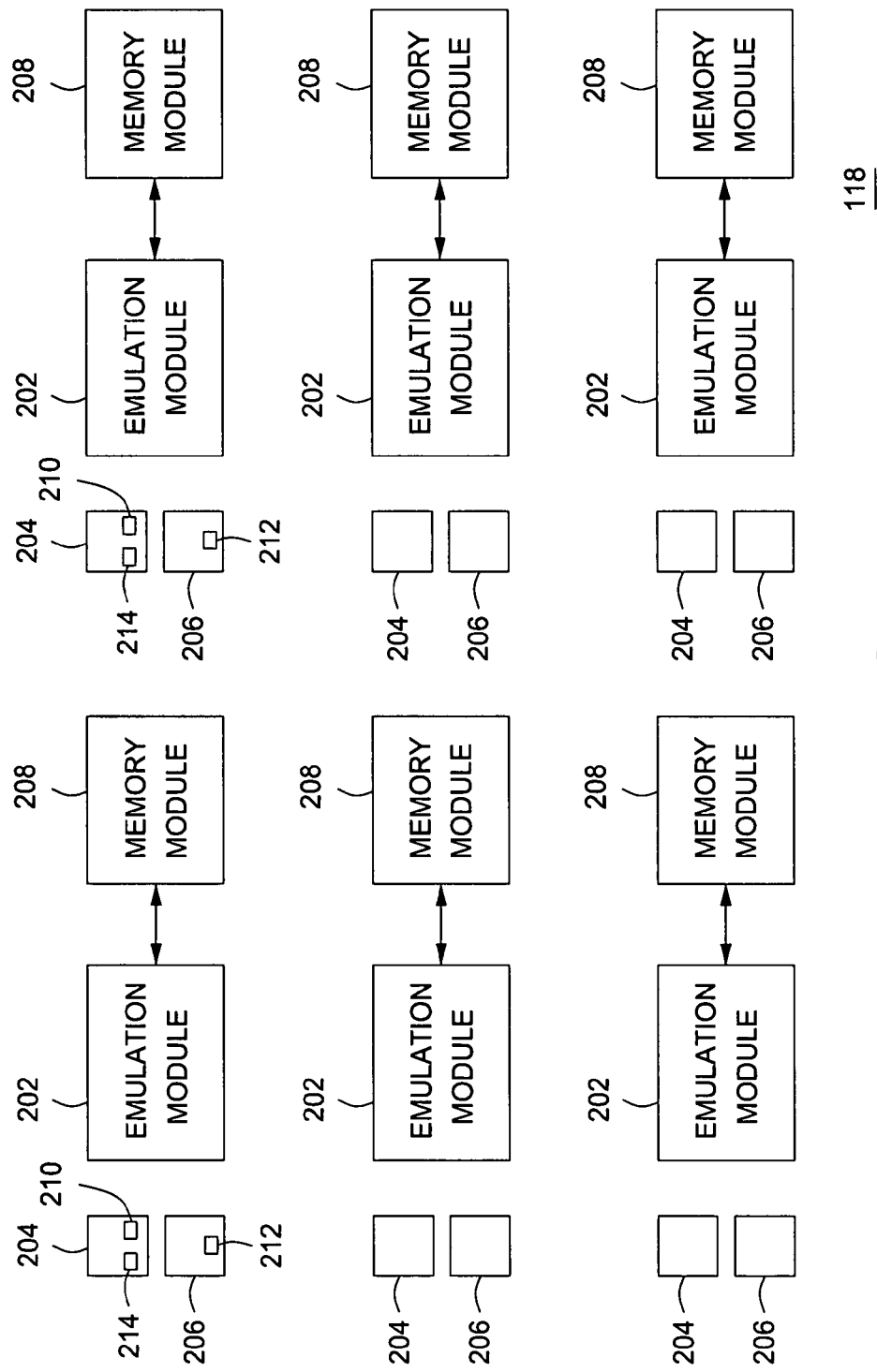
FIG. 2 is a block diagram depicting an exemplary embodiment of a board assembly in accordance with one or more aspects of the invention.

FIG. 2 is a block diagram depicting an exemplary embodiment of a board assembly 118 in accordance with one or more aspects of the invention. The board assembly 118 includes one or more emulation modules 202 (e.g., six are shown). In some embodiments, each of the modules 202 is associated with a power regulator 204 (i.e., a local power regulator). The power regulator 204 acts in conjunction with bulk power regulation for the board assembly 118 to provide current to its associated one of the modules 202. In other embodiments, local power regulation is shared among groups of the modules 202. That is, the board assembly 118 includes one or more power regulators 204 each associated with a plurality of the modules 202. In still other embodiments, the board assembly 118 does not include local power regulation (i.e., the power regulator(s) 204 is/are omitted). Instead, the modules 202 obtain regulated current from the bulk power regulation system, discussed above. As used herein, the term "local power regulation system" is meant to encompass one or more power regulation systems associated with an emulation module, groups of emulation modules, or each emulation module.

In some embodiments, each of the modules 202 is associated with a cooling system 206 (i.e., a local cooling system). The cooling system 206 acts in conjunction with the bulk cooling system for the board assembly 118 to provide cooling for its associated one of the modules 202. For example, the cooling system 206 may comprise a passive heatsink, heat pipes, liquid cooling, and/or local air movers. In other embodiments, local cooling is shared among groups of the modules 202. That is, the board assembly 118 includes one or more cooling systems 206 each associated with a plurality of the modules 202. In still other embodiments, the board assembly 118 does not include local cooling (i.e., the cooling system(s) 206 are omitted). Instead, the modules 202 are cooled by the bulk cooling system, discussed above. Note that, with respect to cooling, the term "local" means cooling elements in addition to the bulk cooling system described above. If the bulk cooling system includes a liquid cooling system, for example, each of the modules 202 or groups of the modules 202 may be associated with heatsinks. Such heatsinks, while being local, may be in effect part of the bulk cooling system. As used herein, the term "local cooling system" is meant to encompass one or more cooling systems associated with an emulation module, groups of emulation modules, or each emulation module.

In some embodiments, the board assembly 118 may include additional modules. For example, the board assembly 118 may include memory modules 208 respectively associated with the emulation modules 202 or associated with groups of the emulation modules 202.

Figure 3:
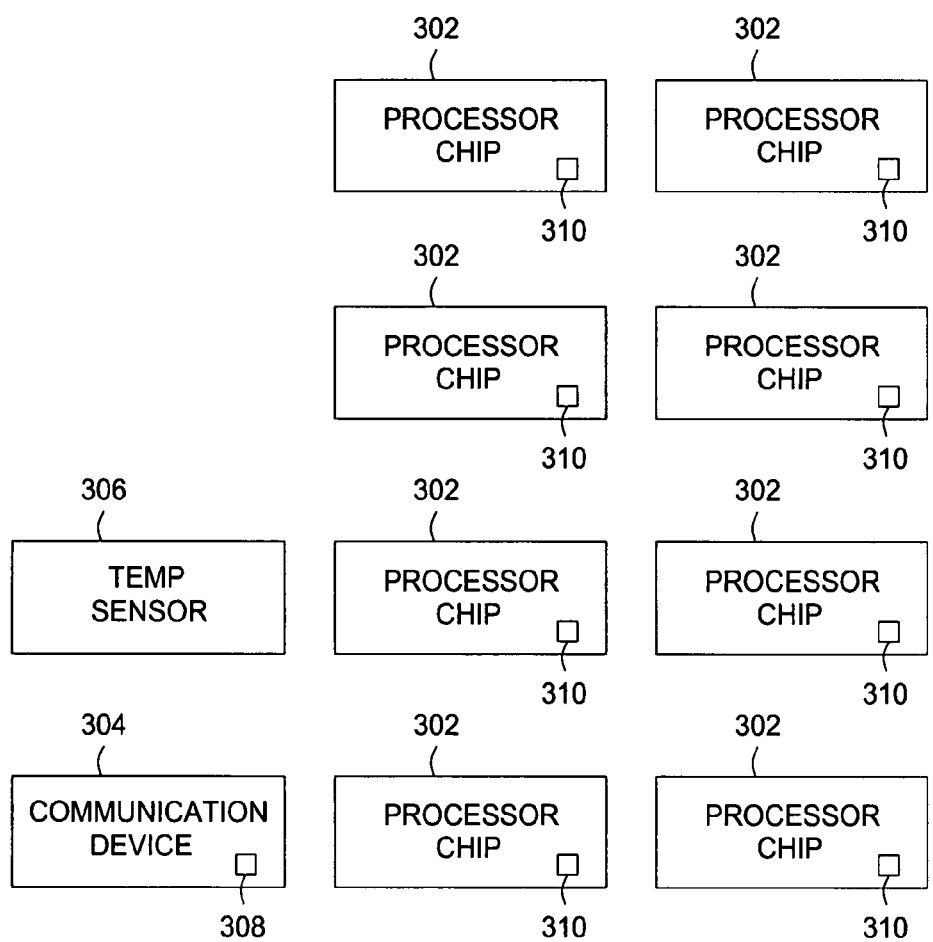
FIG. 3 is a block diagram depicting an exemplary embodiment of an emulation module in accordance with one or more aspects of the invention.

FIG. 3 is a block diagram depicting an exemplary embodiment of an emulation module 202 in accordance with one or more aspects of the invention. The emulation module 202 includes one or more processor chips 302 (e.g., eight are shown) and a communication device 304. Each of the processor chips 302 includes a plurality of cells, each of which performs a simple logic function, such as AND, OR, NOT, NAND, NOR, XOR, and the like. Notably, each of the processor chips 302 can implement any function, which may be different from cycle to cycle, depending on the programming. The communication device 304 permits communication between the host software 108 on one or more computer systems and the emulation module 202. The communication device 304 may also enable communication with other modules, such as memory modules.

Referring to FIGS. 1-3, the emulation system 100 includes a temperature sensing capability. Notably, the emulation system 100 may include one or more of the following temperature sensors: (1) one or more of the emulation modules 202 may include a discrete temperature sensor 306; (2) a temperature sensor 308 may be embedded in the communication device 304 in one or more of the emulation modules 202; (3) a temperature sensor 310 may be embedded in one or more of the processor chips 302 in one or more of the emulation modules 202; (4) a temperature sensor 210 may be embedded in one or more of the power regulators 204 on one or more of the board assemblies 118; (5) a temperature sensor 212 may be embedded in one or more of the cooling systems 206 on one or more of the board assemblies 118; (6) a temperature sensor 124 may be embedded in the cooling system 122 on one or more of the frames 110; (7) a temperature sensor 126 may be embedded in the power regulation system 120 on one or more of the frames 110; and (8) one or more additional discrete temperature sensors located at other locations in the emulation system 100, such as within a main airtake, exhaust, or the like.

The emulation system 100 may also include a current sensing capability. Notably, the emulation system 100 may include a current sensor 214 embedded in one or more of the power regulators 204 on one or more of the board assemblies, and/or a current sensor 128 embedded in the power regulation system 120 on one or more of the frames 110. Accordingly, the emulation system 100 includes a sensor system that comprises temperature sensors and/or current sensors, as described above.

Figure 4:
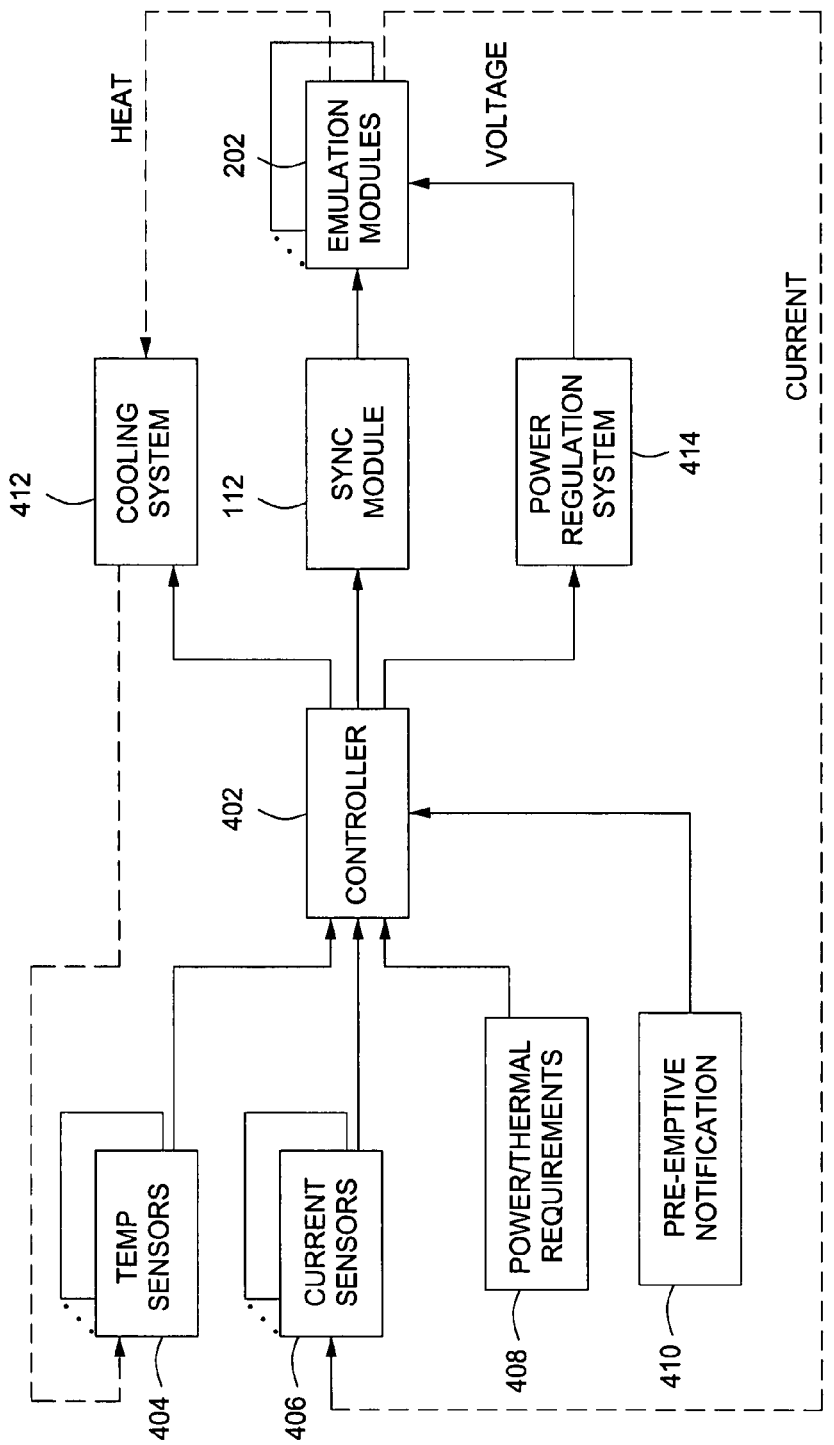
FIG. 4 is a block diagram depicting an exemplary embodiment of a control system in accordance with one or more aspects of the invention.

FIG. 4 is a block diagram depicting an exemplary embodiment of the control system 116 in accordance with one or more aspects of the invention. The control system 116 includes a controller 402 that interfaces with various elements of the emulation system 100. The controller 402 may comprise a microprocessor, a microcontroller, a digital signal processor (DSP), software on a host workstation, a specifically programmed field programmable gate array (FPGA), or like type processing device known in the art. In some embodiments, the controller 402 includes an input interface coupled to one or more temperature sensors 404. The temperature sensors 404 may include any of the various temperature sensors in the emulation system 100 described above, including the temperature sensors 306, 308, 310, 210, 212, 124, and 126.

In some embodiments, the controller 402 also includes an input interface coupled to one or more current sensors 406. The current sensors 406 may include any of the current sensors in the emulation system 100 described above, including the current sensors 214 and 128.

In some embodiments, the controller 402 also includes an input interface configured to receive data from the host software 108 of the host computer systems 102. For example, the controller 402 may be configured to obtain information indicative of power and/or thermal requirements ("power/thermal requirements 408") of a given logic model instantiated by the host software 108 of a given host computer system 102. Notably, the host software 108 may include a resource usage estimation module 150. The resource usage estimation module 150 generates an estimate of the static power and/or thermal requirements of a logic model based on the amount of resources required to emulate the logic model. A static power requirement may include a total current value required by the emulation system 100 to emulate the logic model. A static thermal requirement may include a volume of air and/or liquid required by the emulation system 100 to emulate the logic model without device failure. The values for the static power requirement and/or static thermal requirement may be derived from the number of required resources, including (estimated) numbers of memories, communication signals, required emulation processors, and the like used to emulate the logic model. In addition to the number of required resources, values for the static power requirement and/or static thermal requirement may be derived from utilization of resources, for example, the frequency of reads and writes to memories. The power/thermal requirements 408 represent the total power/thermal requirements for all of the logic models being emulated.

In addition to or alternative to the power/thermal requirements 408, the controller 402 may be configured to obtain a pre-emptive runtime notification 410 of new emulation jobs before they are initiated. Notably, the host software 108 may include a job notification module 152. The job notification module 152 notifies the controller 402 that a new logic model is to be emulated. The job notification module 152 may send the power/thermal requirements for the new logic model to be emulated along with the notification. In this manner, the controller 402 can react to the impending new job and adaptively adjust power settings in response thereto. Power adjustment is discussed below.

In some embodiments, the controller 402 includes an output interface coupled to a cooling system 412. The cooling system 412 includes any of the cooling systems in the emulation system described above, including the bulk cooling system 122 and/or the local cooling system 206. The controller 402 is configured to adjust the output of the cooling system 412 in response to one or more input parameters obtained via the input interfaces, including measurement data from the temperature sensors 404, measurement data from the current sensors 406, the power/thermal requirements 408, and/or the pre-emptive runtime notification data 410. An increase in cooling will cause a decrease in current (e.g., a cooler device draws less leakage current), and hence a decrease the amount of generated heat. A decrease in cooling will cause an increase in current, and hence an increase in the amount of generated heat.

For example, the controller 402 may cause the cooling system 412 to increase cooling in response to a temperature increase or in response to the temperature exceeding a particular threshold. The controller 402 may cause the cooling system 412 to increase cooling in response to a current increase or in response to the current exceeding a particular threshold. The controller 402 may cause the cooling system 412 to increase cooling in response to the static thermal requirement and/or static power requirement 408. The controller 402 may cause the cooling system 412 to increase cooling in response to the pre-emptive notification data 410. The controller 402 may cause the cooling system 412 to increase cooling in response to a combination of such parameters. Likewise, the controller 402 may cause the cooling system 412 to decrease cooling in response to temperature decreases, current decreases, less static thermal/power requirements, or combinations thereof. Cooling may be increased or decreased by increasing or decreasing the volume of airflow via air movers, increasing or decreasing the volume of fluid flow in liquid cooling systems, increasing or decreasing a combination of the volume of air and fluid flow, and the like. The cooling adjustment may be global or local, which may depend on the origin of the input parameters. For example, if sensor data (e.g., temperature and/or current) is obtained locally from a particular module 202 or group of modules 202, then the local cooling system 206 associated with the module 202 or group of modules 202 may be adjusted (if present) in addition to or alternatively to the adjusting the bulk cooling system 122 for the frame or group of frames.

In some embodiments, the controller 402 includes an output interface coupled to a power regulation system 414. The power regulation system 414 includes any of the power regulation systems in the emulation system 100 described above, including the bulk power regulation system 120 and/or local power regulation system 204. The controller 402 is configured to adjust voltage output of the power regulation system 414 in response to one or more input parameters obtained via the input interfaces, including measurement data from the temperature sensors 404, measurement data from the current sensors 406, the power/thermal requirements 408, and/or the pre-emptive runtime notification data 410. A decrease in voltage output will cause a decrease in average power consumed, and hence a decrease in generated heat. An increase in voltage output will cause an increase in average power consumed, and hence an increase in the amount of generated heat. Generally, a particular voltage must be maintained for the emulation modules 202 to guarantee that the circuits perform at a high enough clock frequency to meet cycle time requirements of the emulation system. Typically, there is a significant voltage drop between the power regulation system 414 and the emulation modules 202. If the emulation modules 202 draw less current, then the voltage drop between the power regulation system 414 and the emulation modules 202 decreases, enabling a reduction in the regulated voltage while maintaining the minimum voltage required by the emulation modules 202.

For example, the controller 402 may cause the power regulation system 414 to decrease voltage in response to a temperature increase or in response to the temperature exceeding a particular threshold. The controller 402 may cause the power regulation system 414 to decrease voltage in response to a current increase or in response to the current exceeding a particular threshold. The controller 402 may cause the power regulation system 414 to decrease voltage in response to the static thermal requirement and/or static power requirement 408. The controller 402 may cause the power regulation system 414 to decrease voltage in response to the pre-emptive notification data 410. The controller 402 may cause the power regulation system 414 to decrease voltage in response to a combination of such parameters. Likewise, the controller 402 may cause the power regulation system 414 to increase voltage in response to temperature decreases, current decreases, less static thermal/power requirements, or combinations thereof. The voltage adjustment may be global or local, which may depend on the origin of the input parameters. For example, if sensor data (e.g., temperature and/or current) is obtained locally from a particular module 202 or group of modules 202, then the local power regulation system 204 associated with the module 202 or group of modules 202 may be adjusted (if present) in addition to or alternatively to the adjusting the bulk power regulation system 120 for the frame or group of frames.

In some embodiments, the controller 402 includes an output interface coupled to the synchronization module 112. The synchronization module 112 drives clock and control signals that synchronize the frames 110 and in turn synchronize the emulation modules 202 on the board assemblies 118 in the frames 110. The controller 402 is configured to adjust the frequency of the clock signal provided by the synchronization module 112 for the emulation system 100. Alternatively to or in additional to clock frequency adjustment, the controller 402 may be configured to adjust the duty cycle of the emulation system 100 (i.e., the percentage of time a logic model or logic models is/are emulated). The duty cycle of the emulation system 100 is controllable for each design being emulated. The controller 402 adjusts the clock frequency and/or duty cycle in response to one or more input parameters, including measurement data from the temperature sensors 404, measurement data from the current sensors 406, the power/thermal requirements 408, the power/thermal requirements 408, and/or the pre-emptive runtime notification data 410. A decrease in the clock frequency and/or duty cycle will decrease average power consumed, which will in turn decrease the amount of generated heat. Likewise, an increase in the clock frequency and/or the duty cycle will increase average power consumed, which will in turn increase the amount of generated heat.

For example, the controller 402 may cause the clock frequency and/or duty cycle to decrease in response to a temperature increase or in response to the temperature exceeding a particular threshold. The controller 402 may cause the clock frequency and/or duty cycle to decrease in response to a current increase or in response to the current exceeding a particular threshold. The controller 402 may cause the clock frequency and/or duty cycle to decrease in response to the static thermal requirement and/or static power requirement 408. The controller 402 may cause the clock frequency and/or duty cycle to decrease in response to the pre-emptive notification data 410. The controller 402 may cause the clock frequency and/or duty cycle to decrease in response to a combination of such parameters. Likewise, the controller 402 may cause the clock frequency and/or duty cycle to increase in response to temperature decreases, current decreases, less static thermal/power requirements, or combinations thereof.

Figure 5:
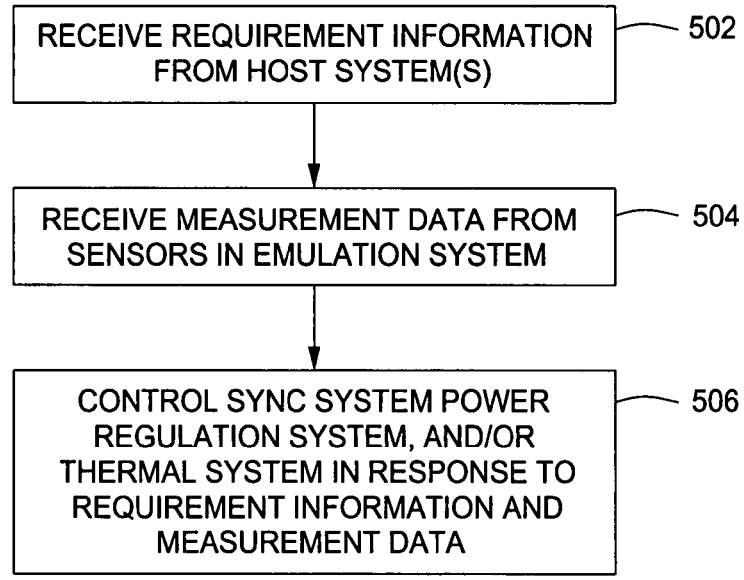
FIG. 5 is a flow diagram depicting an exemplary embodiment of a method for controlling power in an emulation system coupled to one or more host computer systems in accordance with one or more aspects of the invention.

FIG. 5 is a flow diagram depicting an exemplary embodiment of a method 500 for controlling power in an emulation system coupled to one or more host computer systems in accordance with one or more aspects of the invention. The method 500 begins at block 502, where requirement information for each logic module emulated is received from the host computer system(s). In some embodiments, the requirement information includes at least one of a power requirement and a thermal requirement. In some embodiments, the power requirement comprises at least one of a static power requirement based on estimated resource usage or a dynamic power requirement based on an impending emulation job. The thermal requirement may comprise at least one of a static thermal requirement based on the estimated resource usage or a dynamic power requirement based on the impending emulation job.

At block 504, measurement data is received from sensors in the emulation system. In some embodiments, the measurement data includes at least one of temperature data from temperature sensors in the emulation system and current data from current sensors in the emulation system.

At block 506, at least one of a synchronization system, a power regulation system, and a thermal system in the emulation system is controlled in response to the requirement information and the measurement data to reduce power load of the emulation system. In some embodiments, the synchronization system is driven to adjust at least one of a frequency of a clock signal applied to the emulation system or a duty cycle of the emulation system. In other embodiments, the power regulation system is driven to adjust voltage output applied to the emulation system. In still other embodiments, the thermal system is driven to adjust at least one of a volume of air or a volume of liquid moved in the thermal system.

Figure 6:
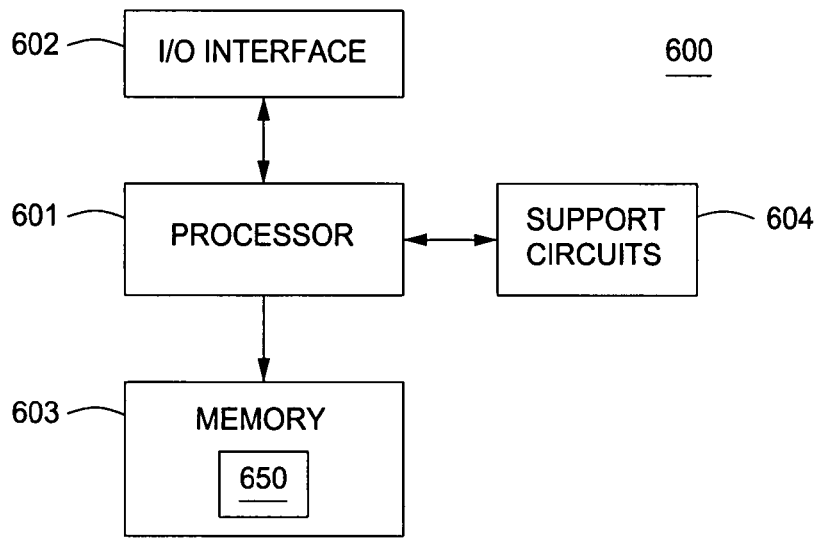
FIG. 6 is a block diagram depicting an exemplary embodiment of a computer system in accordance with one or more aspects of the invention.

FIG. 6 is a block diagram depicting an exemplary embodiment of a computer system 600 in accordance with one or more aspects of the invention. The computer system 600 may be used to implement the controller 402. The computer system 600 includes a processor 601, a memory 603, various support circuits 604, and an I/O interface 602. The processor 601 may include one or more microprocessors known in the art. The support circuits 604 for the processor 601 include conventional cache, power supplies, clock circuits, data registers, I/O interfaces, and the like. The I/O interface 602 may be directly coupled to the memory 603 or coupled through the processor 501. The I/O interface 602 may also be configured for communication with various sensors (temperature and/or current), as well as a communication device for network communication with other computer systems.

The memory 603 stores processor-executable instructions and/or data that may be executed by and/or used by the processor 601. These processor-executable instructions may comprise hardware, firmware, software, and the like, or some combination thereof. A module having processor-executable instructions that are stored in the memory 603 may include a control module 650. The control module 650 is configured to perform the functions of the controller 402 described above. The memory 603 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. Apparatus for controlling power in an emulation system coupled to a host computer system, comprising:
 a first interface configured to receive requirement information for a logic module to be emulated from the host computer system, the requirement information including at least one of a power requirement or a thermal requirement based on an amount of resources in the emulation system required to emulate a logic model;
 a second interface configured to receive measurement data from sensors in the emulation system; and
 a controller configured to control a synchronization system, a power regulation system, and a thermal system in the emulation system in response to the requirement information and the measurement data to reduce power load of the emulation system, the controller configured to receive a pre-emptive runtime notification and to adaptively adjust one or more power settings based upon, at least in part, a job notification module;
 wherein the measurement data includes temperature data from temperature sensors in the emulation system and current data from current sensors embedded in the emulation system.

2. The apparatus of claim 1, wherein the controller is configured to control the synchronization system to adjust at least one of: a frequency of a clock signal applied to the emulation system or a duty cycle of at least one design being emulated in the emulation system.

3. The apparatus of claim 1, wherein the controller is configured to control the power regulation system to adjust voltage output applied to the emulation system.

4. The apparatus of claim 1, wherein the controller is configured to control the thermal system by adjusting at least one of: a volume of air or a volume of liquid moved in the thermal system.

5. The apparatus of claim 1, wherein the power requirement comprises at least one of a static power requirement based on estimated resource usage or a dynamic power requirement based on an impending emulation job, and wherein the thermal requirement comprises at least one of a static thermal requirement based on the estimated resource usage or a dynamic thermal requirement based on the impending emulation job.

6. The apparatus of claim 1, wherein the thermal requirement comprises a dynamic thermal requirement based on an impending emulation job.

7. An emulation system, comprising:
 an emulation engine;
 a synchronization module for providing clock signals to the emulation engine;
 a communication module;
 a cooling system for cooling the emulation engine;
 a power regulation system for providing power to the emulation engine;
 a sensor system for measuring temperature and current; and
 a control system for receiving requirement information for a logic module to be emulated from the communication module, receiving measurement information from the sensor system, and controlling at least one of the synchronization module, the power regulation system, and the cooling system in response to the requirement information and the measurement data to reduce power load of the emulation system, wherein the requirement information includes at least one of a power requirement and a thermal requirement based on the amount of resources in the emulation engine required to emulate the logic model, the control system configured to receive a pre-emptive runtime notification and to adaptively adjust one or more power settings based upon, at least in part, a job notification module;
 wherein the sensor system is embedded in the emulation system.

8. The system of claim 7, wherein the emulation engine includes frames, each of the frames including board assemblies, each of the board assemblies including emulation modules, each of the emulation modules including processor chips.

9. The system of claim 8, wherein the cooling system includes a bulk cooling system respectively associated with the frames or with groups of the frames, and wherein the power regulation system includes bulk power regulation system respectively associated with the frames or with groups of the frames.

10. The system of claim 9, wherein the cooling system includes a local cooling system respectively associated with the emulation modules or with groups of the emulation modules, and wherein the power regulation system includes a local power regulation system respectively associated with the emulation modules or with groups of the emulation modules.

11. The system of claim 10, wherein the sensor system comprises at least one of:
 a discrete temperature sensor in one or more of the emulation modules;
 a temperature sensor embedded in one or more of the processor chips;
 one or more temperature sensors embedded in the bulk power regulation system;
 one or more temperature sensors embedded in the local power regulation system;
 one or more temperature sensors embedded in the bulk cooling system; or
 one or more temperature sensors embedded in the local cooling system.

12. The system of claim 7, wherein the power requirement comprises at least one of a static power requirement based on estimated resource usage or a dynamic power requirement based on an impending emulation job, and
 wherein the thermal requirement comprises at least one of a static thermal requirement based on the estimated resource usage or a dynamic thermal requirement based on the impending emulation job.

13. The system of claim 7, further comprising:
 a host computer system coupled to the communication module, the host computer system configured to execute host software.

14. The system of claim 13, wherein the host software is configured to provide the requirement information.

15. The system of claim 7, wherein the thermal requirement comprises a dynamic thermal requirement based on an impending emulation job.

16. A method for controlling power in an emulation system coupled to a host computer system, comprising:
 receiving requirement information for a logic module to be emulated from the host computer system, the requirement information including at least one of a power requirement or a thermal requirement based on an amount of resources in the emulation system required to emulate a logic model;

receiving measurement data from sensors in the emulation system; and controlling a synchronization system, a power regulation system, and a thermal system in the emulation system in response to the requirement information and the measurement data to reduce power load of the emulation system, wherein controlling is performed by a controller configured to receive a pre-emptive runtime notification and to adaptively adjust one or more power settings based upon, at least in part, a job notification module;

wherein the measurement data includes temperature data from temperature sensors in the emulation system and current data from current sensors embedded in the emulation system.

17. The method of claim 16, wherein the controlling comprises:

driving the synchronization system to adjust at least one of: a frequency of a clock signal applied to the emulation system or a duty cycle of at least one design being emulated in the emulation system.

18. The method of claim 16, wherein the controlling comprises:

driving the power regulation system to adjust voltage output applied to the emulation system.

19. The method of claim 16, wherein the controlling comprises:

driving the thermal system to adjust at least one of: a volume of air or a volume of liquid moved in the thermal system.

20. The method of claim 16, wherein the power requirement comprises at least one of a static power requirement based on estimated resource usage or a dynamic power requirement based on an impending emulation job, and wherein the thermal requirement comprises at least one of a static thermal requirement based on the estimated resource usage or a dynamic thermal requirement based on the impending emulation job.

21. The method of claim 16, wherein the thermal requirement comprises a dynamic thermal requirement based on an impending emulation job.

* * * * *